United States Patent [19]

Payet et al.

[11] Patent Number: 4,542,771

[45] Date of Patent: Sep. 24, 1985

[54] ADJUSTABLE ANVIL FOR ULTRASONIC MATERIAL CUTTING AND SEALING APPARATUS

[75] Inventors: George L. Payet, Fort Mill; James E. Hendrix, Spartanburg; Jack R. Lowery, Sr., Lancaster, all of S.C.

[73] Assignee: Springs Industries, Inc., Fort Mill, S.C.

[21] Appl. No.: 576,889

[22] Filed: Feb. 3, 1984

[51] Int. Cl.[4] .............................................. D03J 1/08
[52] U.S. Cl. ............................... 139/302; 156/580.1; 139/291 C
[58] Field of Search ................... 139/302, 291 C, 303; 156/73.3, 88, 515, 580.1, 580.2; 28/170; 83/346, 701, 659

[56] References Cited

U.S. PATENT DOCUMENTS 3,294,616 12/1966 Linsley et al. ................. 156/580.1
3,489,184 1/1970 Bernath ............................. 139/302
3,582,144 12/1974 Parry ................................. 156/510

Primary Examiner—Henry S. Jaudon
Assistant Examiner—S. Shongut
Attorney, Agent, or Firm—Bell, Seltzer, Park & Gibson

[57] ABSTRACT

An improved anvil construction, for use in an ultrasonic apparatus for edge cutting and sealing moving lengths of at least partially thermoplastic material, particularly textile fabric having at least some thermoplastic fibers, and including a vibrating sonic horn cooperating with and vibrating against the anvil for such ultrasonic edge cutting and sealing as the material moves between the sonic horn and the anvil. The anvil includes a peaked cutting edge and first and second surfaces extending in respective opposite directions from the cutting edge and is characterized by being adjustable to positions for effecting clean and sharp edge cutting and desired amounts of edge sealing in the material while resisting wear on the anvil. Such adjustment is in the form of pivotal movement of an anvil member to adjust the acuteness of the included angles of first and second surfaces extending from the cutting edge of the anvil and in the form of timed rotation of an anvil wheel member so that a fresh portion of the cutting edge thereof may be positioned for contact by the sonic horn when wear occurs on such cutting edge.

14 Claims, 10 Drawing Figures

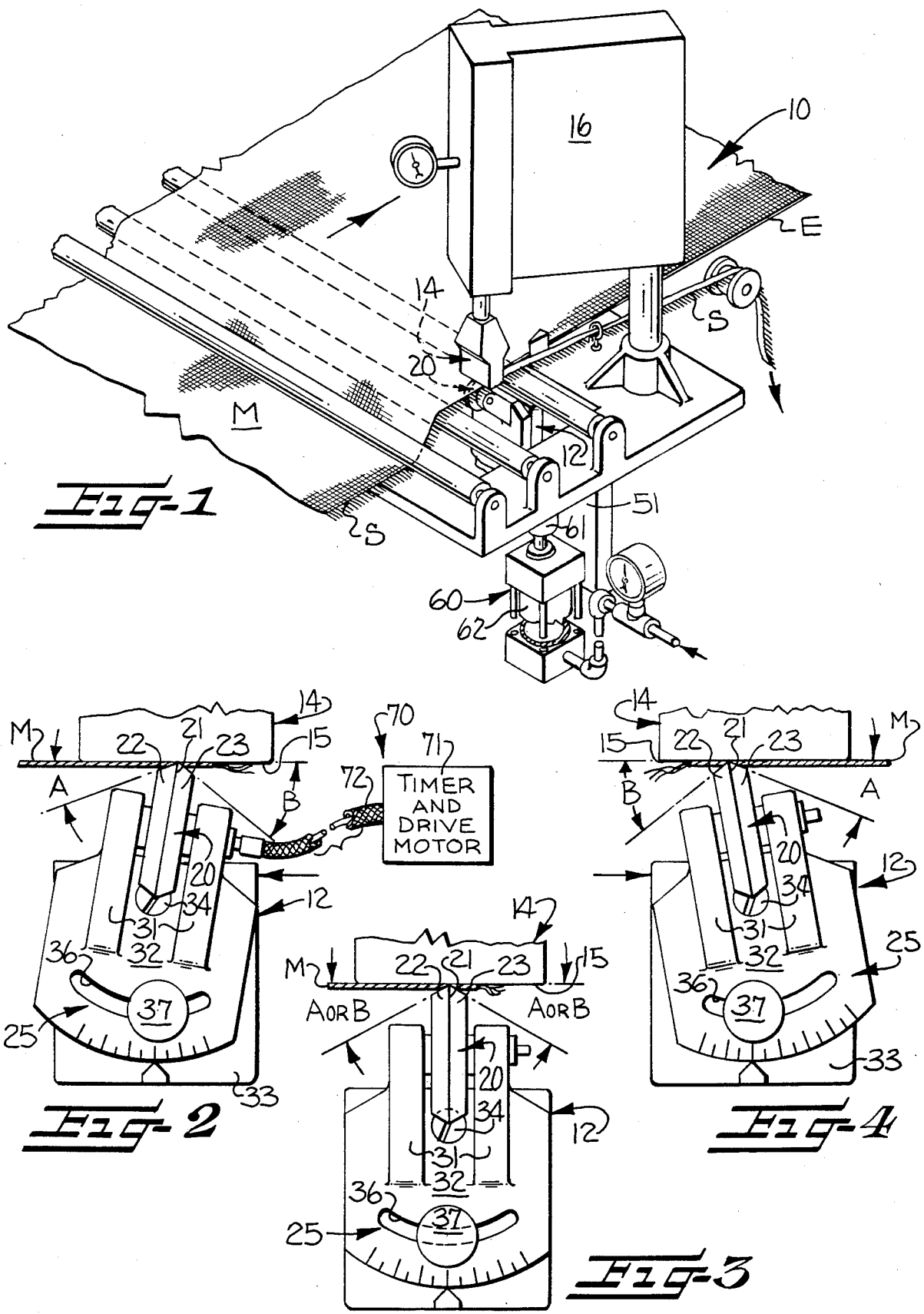

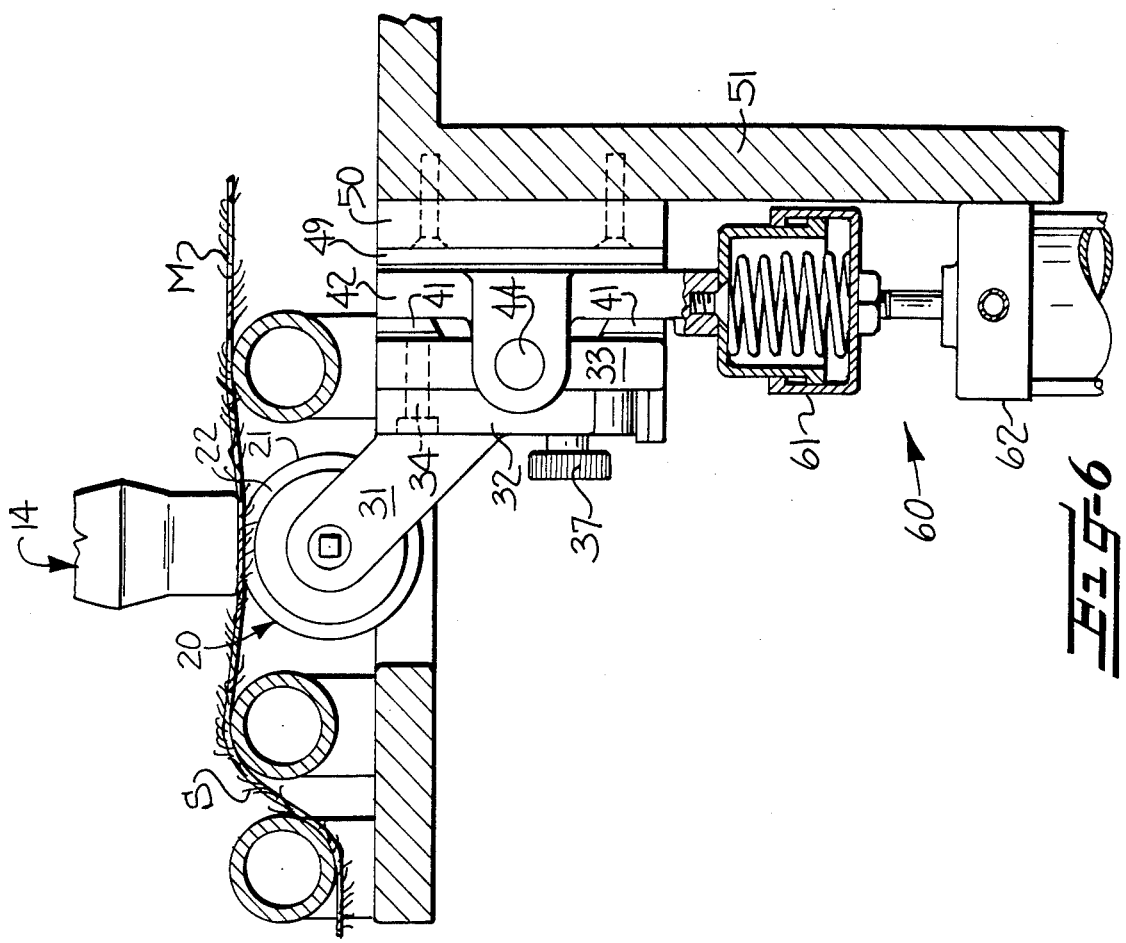
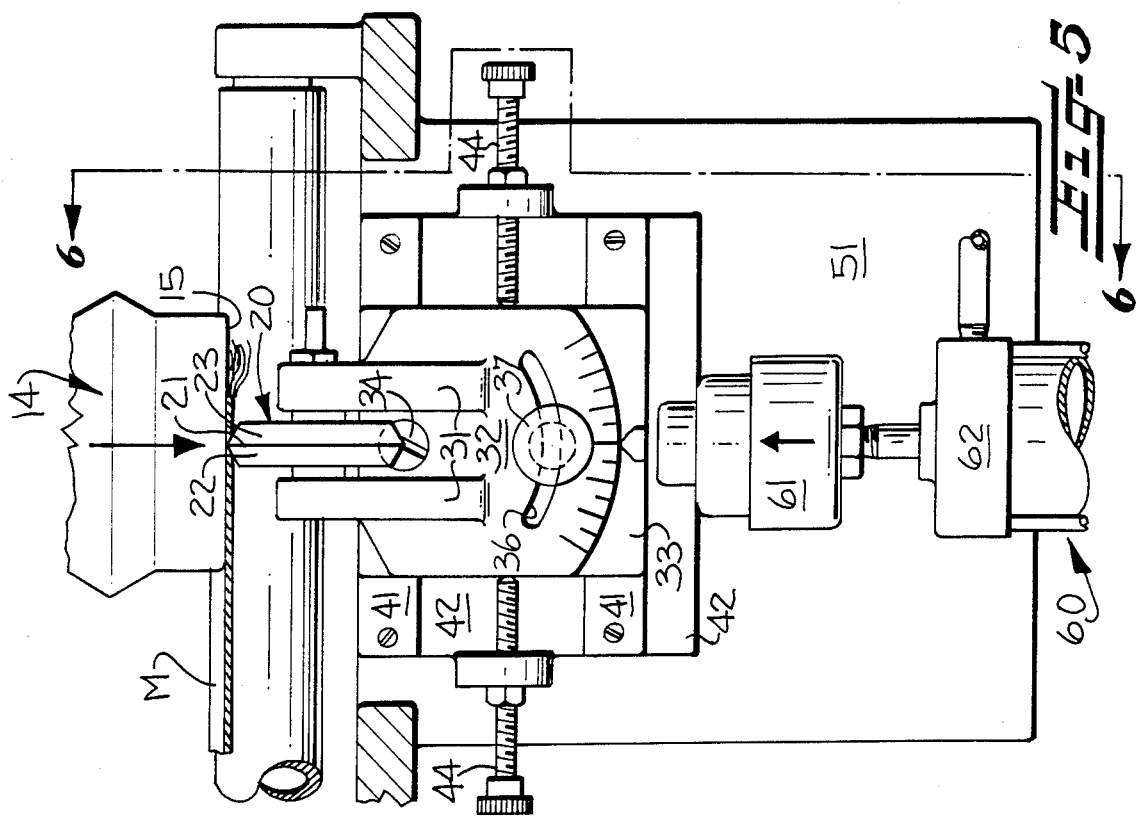

U.S. Patent  Sep. 24, 1985  Sheet 3 of 3  4,542,771
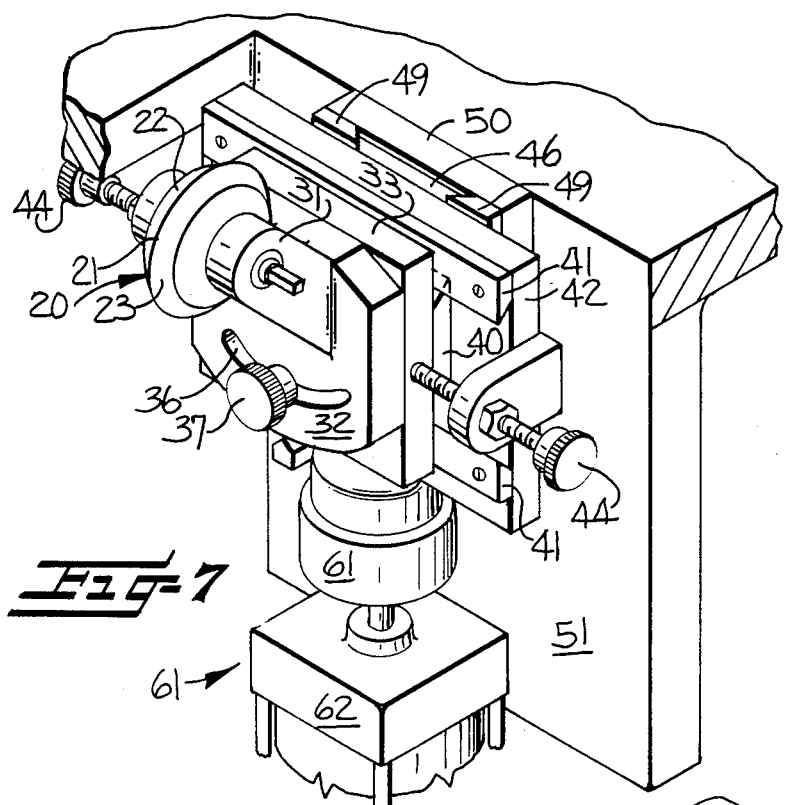
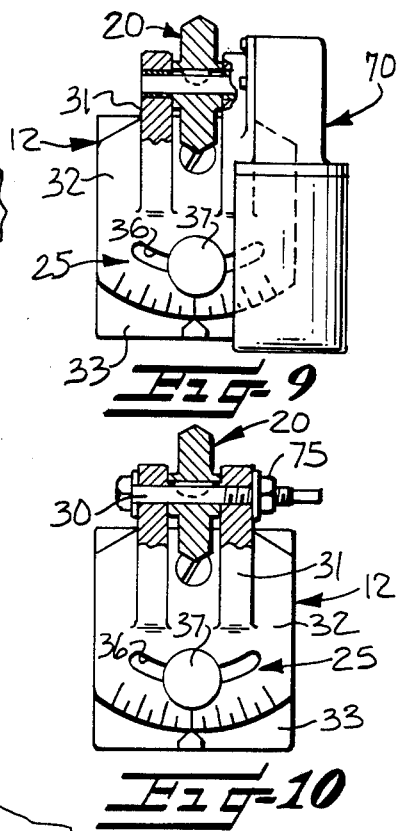
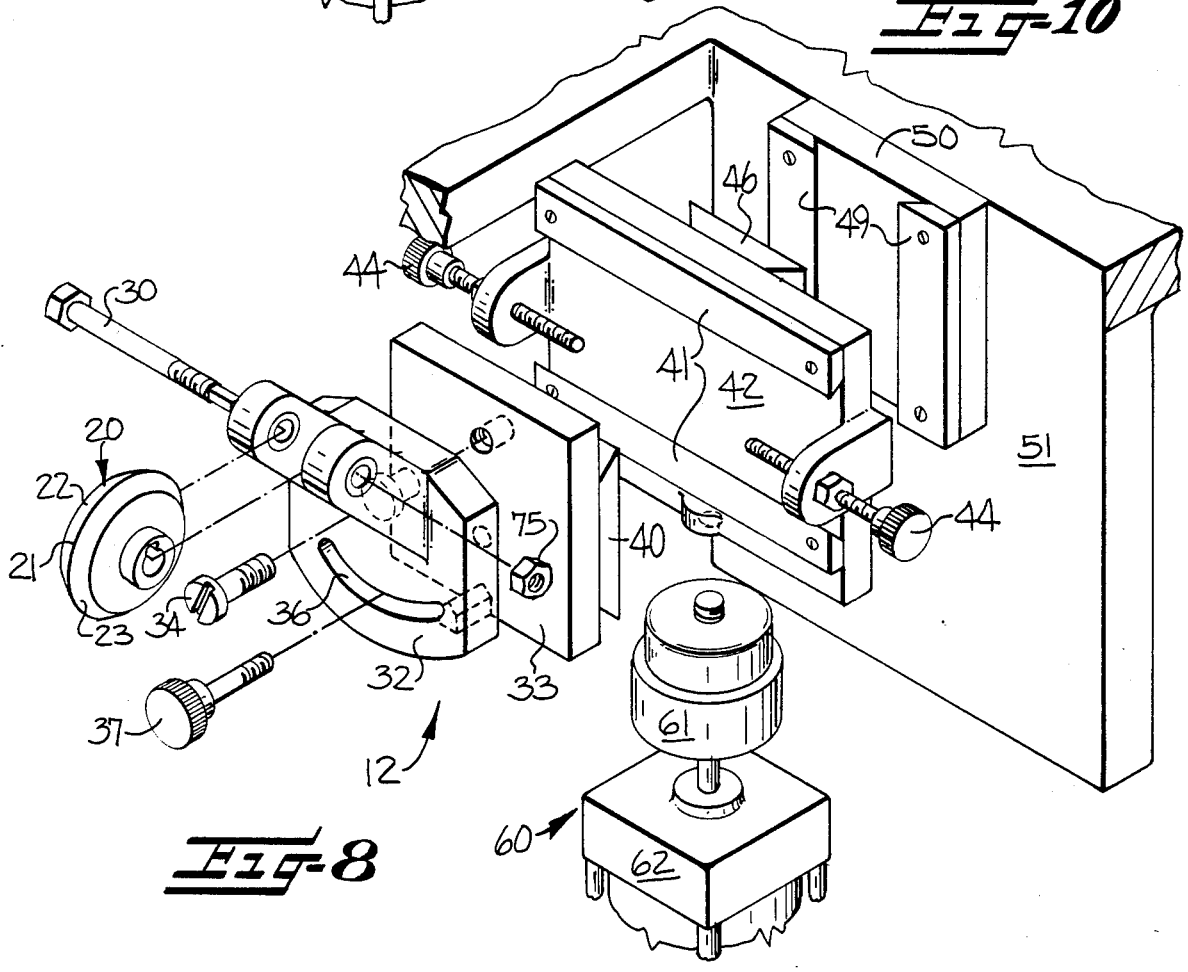

ADJUSTABLE ANVIL FOR ULTRASONIC MATERIAL CUTTING AND SEALING APPARATUS

FIELD OF THE INVENTION

This invention relates to an ultrasonic apparatus for edge cutting and sealing moving lengths of at least partially thermoplastic material, particularly textile fabric having at least some thermoplastic fibers, and including an anvil and a vibrating sonic horn cooperating with and vibrating against the anvil for ultrasonic edge cutting and sealing as the material moves between the sonic horn and the anvil, and more particularly to an improved construction of the anvil which is characterized by being adjustable to positions for effecting clean and sharp edge cutting and desired amounts of edge sealing in the material while resisting wear on the anvil.

BACKGROUND OF THE INVENTION

In fabricating products from continuous lengths of at least partially thermoplastic material, it is often necessary to cut off predetermined amounts of undesirable material from each longitudinal side edge portion of the material. This is particularly true when the material is textile fabric having at least some thermoplastic fibers and woven on air jet looms or the like which produce fringed selvages along the longitudinal side edges which are not desirable in the fabricated end products, such as bed sheets, piece goods or the like, as more fully set forth in copending application Ser. No. 555,664, filed Nov. 28, 1983, and assigned to the assignee of the present sent application, the disclosure of which is incorporated herein by reference.

As set forth in the aforementioned, copending application, various types of apparatuses were investigated by assignee for cutting off predetermined widths of undesirable material or selvage and sealing the cut edges to produce an aesthetically pleasing cut and sealed edge, which in the case of bed sheets, piece goods or the like, required a wash durability of at least 25 to 50 washings without significant raveling of the yarns at the cut and sealed edges. As a result of these investigations, ultrasonic apparatus was chosen as being the most promising for accomplishing the above. However, for the most part, such ultrasonic apparatus had been primarily commercially utilized with all plastic or thermoplastic sheet materials. Notwithstanding, such ultrasonic apparatus had been proposed for cutting and edge sealing textile fabrics having at least some thermoplastic yarns therein and is advantageous for a number of reasons as compared to other types of operations, including cutting and hemming operations.

As a result of experimentation with commercially available ultrasonic apparatus, it was determined that the construction of such ultrasonic apparatus did not satisfactorily cut clean and sharp edges along the material, while providing desired amounts of edge sealing in the material and while resisting wear on the anvil. Specifically, it was found with the use of this commercially available ultrasonic cutting and sealing apparatus, that, if a particular commercially available anvil construction was utilized which provided a clean and sharp cut along the edge of the material, then a desired amount of edge sealing inwardly of the cut edge was not obtained and the anvil would wear and not perform satisfactorily after a short period of use. On the other hand, it was found that if a commercially available anvil construction was utilized which produced a desired amount of edge sealing inwardly of the ultrasonically cut edges, then a clean and sharp cut was not obtained along the edges of the material. Other problems with such commercially available ultrasonic apparatus are set forth in the aforementioned copending application.

OBJECTS AND SUMMARY OF THE INVENTION

Accordingly, it is the object of this invention to provide an improved construction of an anvil in an ultrasonic edge cutting and sealing apparatus for moving lengths of material which will effect clean and sharp edge cutting and desired amounts of edge sealing in the material while resisting wear on the anvil.

It has been found by this invention that the above object may be accomplished by providing an improved anvil construction which is characterized by being adjustable to positions for effecting the above described desired results and which comprises generally the following.

An anvil member, preferably in the shape of a wheel having a beveled periphery, defines a peaked cutting edge for cutting the moving material as the sonic horn vibrates against the cutting edge, and first and second surfaces extending in respective opposite directions from the peaked cutting edge and forming respective included acute angles with the sonic horn face from the cutting edge.

The anvil member is mounted for selective pivotal movement about an axis perpendicular to the cutting edge for varying the predetermined included angles of the first and second surfaces so that the included angle of the first surface is less than the included angle of the second surface to effect a clean and sharp cutting of the moving material, to seal the cut edge of the material a predetermined distance inwardly of the cut edge as the sonic horn vibrates against the anvil member, and to reinforce the cutting edge to resist wear. The predetermined distance of sealing is determined by and increases with the increasing acuteness of the included angle of the first surface. Preferably, the anvil also includes timed driving means connected with the anvil member for rotating the anvil member constantly at a predetermined very slow speed or a predetermined distance at predetermined time intervals.

BRIEF DESCRIPTION OF THE DRAWINGS

Some of the objects and advantages of this invention have been set forth above, other objects and advantages of the invention will become apparent in the detailed description to follow when taken in conjunction with the accompanying drawings, in which:

FIG. 1 is a schematic view of ultrasonic cutting and sealing apparatus constructed in accordance with this invention;

FIGS. 2-4 are partial elevational views showing the anvil member of this invention in various adjusted positions;

. FIG. 5 is a partial, side elevational view of the ultrasonic apparatus constructed in accordance with this invention;

FIG. 6 is a partial sectional, elevational view taken generally along the lines 6—6 of FIG. 5;

FIG. 7 is a partial perspective view of the anvil of the ultrasonic apparatus constructed in accordance with this invention;

FIG. 8 is an exploded perspective view of the mechanisms shown in FIG. 7;

FIGS. 9 and 10 are respective sectional views of a portion of the anvil constructed in accordance with this invention.

DETAILED DESCRIPTION OF PREFERRED EMBODIMENTS OF THE INVENTION

Referring now to the drawings, an ultrasonic apparatus, generally indicated at 10, is illustrated for cutting and sealing moving lengths of at least partially thermoplastic material M, particularly textile fabric having at least some thermoplastic fibers wherein undesirable selvage S is ultrasonically cut off and the longitudinal cut edges E are ultrasonically sealed a predetermined desired distance inwardly of such cut edges as more fully explained in the aforementioned copending application Ser. No. 555,664. Such ultrasonic edge cutting and sealing apparatus 10 may be mounted for cutting off undesirable material or selvage S along one longitudinal edge of moving material M, as illustrated in FIG. 1, or ultrasonic apparatus 10 may be mounted along both longitudinal edges of moving material M, as illustrated in the aforementioned copending application, and may be used in on-the-loom mechanisms or off-the-loom mechanisms, as more fully discussed in the aforementioned copending application. In addition, the ultrasonic apparatus 10 of this invention may also be utilized in other types of machines for cutting and edge sealing material M which is at least partially thermoplastic and which may include material other than textile fabric.

The ultrasonic apparatus 10 includes anvil means 12 and vibrating sonic horn means 14 having a flat working face 15 cooperating with and vibrating against the anvil means 12 for the ultrasonic edge cutting and sealing as the material M moves between the sonic horn means 14 and the anvil means 12.

As well understood by those with ordinary skill in the art, the vibrating sonic horn means 14 includes transducer and booster mechanisms, indicated in FIG. 1 at 16, which convert an electrical signal from a power supply to mechanical vibrations and boost such mechanical vibrations. The sonic horn means 14 vibrates up and down as a result of the boosted vibrational energy produced by the transducer and booster 16.

In accordance with this invention, the anvil means 12 includes an anvil member 20, preferably in the shape of a wheel having a beveled periphery, defining a peaked cutting edge 21 for cutting the moving material M as the sonic horn means vibrates against the cutting edge 21, and first and second surfaces 22, 23 extending in respective opposite directions from the peaked cutting edge and forming respective included acute angles A, B with the horn face 15 from the cutting edge 21.

The anvil means 12 further includes means 25 mounting the anvil member 20 for selective pivotal movement about an axis perpendicular to the cutting edge 21, as shown particularly in FIGS. 2–4, for varying the included acute angles A, B of the first and second surfaces 22, 23 so that the included angle A of the first surface 22 is less than the included angle B of the second surface 23 to effect a clean and sharp cutting of the moving material and for providing a desired predetermined included angle for the first surface 22 to seal the cut edge E of the material M a predetermined distance inwardly of the cut edge E as the sonic horn means 14 and face 15 vibrates against the anvil member and a predetermined included angle B for the second surface 23 for reinforcing the anvil cutting edge 21 to resist wear on the anvil cutting edge 21. The predetermined distance of sealing is determined by and increases with the increasing acuteness of the predetermined included angle A of the first sealing surface 22.

The sealing effect and its relation to the acuteness of the angle A of the first sealing surface 23, the cutting effect of the cutting edge 21 and the reinforcing effect of the reinforcing surface 22 are all fully explained in the aforementioned copending application and reference may be had thereto for a full explanation and will not be repeated herein. However, in contrast to the anvil means utilized in the aforementioned copending application in which the acute angles A, B of the first and second surfaces 22, 23 of the anvil member were fixed at predetermined angles, the mounting means 25 in accordance with the present invention allows the use of an anvil member in which the predetermined included angles A, B of the first and second surfaces 22, 23 of the anvil member 20 may be equal when the anvil member 22 is positioned by the mounting means 25 perpendicular to the sonic horn face 15, as shown in FIG. 3.

As a practical matter, the anvil member 20 will never be positioned in use such that the angles A, B of the first and second surfaces 22, 23 are equal, as shown in FIG. 3, but will always be positioned, as shown in FIGS. 2 and 4, in which the angle A of the first surface 22 is less than the angle B of the second surface 23. Also, the first surface 22 will always be positioned inwardly of the cut edge E being cut longitudinally of the moving material M to effect the ultrasonic sealing, as discussed in the aforementioned copending application. Thus, when the anvil member 20 is positioned by the mounting means 25, as shown in FIG. 2, the ultrasonic apparatus 10 will be utilized in the position shown in FIG. 1 along the right longitudinal edge of the moving material M and when the anvil member 20 is positioned, as shown in FIG. 4, the ultrasonic apparatus 10 will be positioned along the left side of the moving material M.

The anvil member 20 is preferably positioned by the mounting means 25 so that the included angle A of the first sealing surface 22 of the anvil member 20 is about 3 to 20 degrees and more preferably about 5 to 15 degrees; whereas, the included angle B of the second reinforcing surface 23 is at least 2½ degrees larger than the included angle A of the first sealing surface 22 and no greater than 45 degrees, and more preferably about 30 degrees, for the reasons more fully explained in the aforeorementioned copending application.

The anvil means 12 of this invention with the pivotal mounting means 25 is advantageous over the anvil construction of the aforementioned copending application for the following reasons. With the arrangement of the aforementioned copending application, a series of anvil members must be used for different material and when problems in sealing occur to vary the included angle of the sealing surface. However with the arrangement of the present invention, a single anvil member 20 can be positioned by the mounting means 25 at various included angles for the sealing surface 22.

In accordance with a preferred embodiment of this invention, the anvil member 20, in the form of a wheel, is rotatably mounted on and keyed to a shaft 30 which is carried by a U-shaped collar 31 carried by a plate 32 pivotally mounted on another plate 33 by screw 34 so that the plate 32 may be pivoted about the screw 34 to in turn pivot the anvil wheel 20 about an axis perpendicular to the cutting edge 21. There is provided an arcuate slot 36 in the plate member 32 and a threaded screw 37 extending therethrough and into the plate 33 so that the screw 37 may be loosened and the plate 32 pivoted relative to the plate 33. The arcuate slot 36 or the bottom of the plate 32 may be provided with indicia, as shown in FIGS. 2-4, with an indicator on plate 33 to illustrate the pivoted position of the anvil wheel member 20.

The plate 33 may have secured to the rear face thereof a dovetail slide member 40 which is received between comlimentary bars 41 on a further plate member 42 for allowing movement of the plates 32, 33 and anvil wheel member 20 parallel to the sonic horn face for compensating for pivotal movement of the anvil wheel member 20 and to align the cutting edge 21 with the desired portion of the sonic horn face 15 after such pivotal movement. Adjustment screws 44 may be provided on each side of the plate 42 to effect such parallel movement. The plate 42 also has a dovetail slide member 46 on the rear face thereof which is received between bars 49 on a further plate 50 which is secured to a frame portion 51 of the anvil means 12. The bars 51 and dovetail slide 46 are so arranged that the plates 32, 33 and 34 may move up and down and thus provide for movement of the anvil member 20 perpendicular to the sonic horn face for also compensating for pivotal movement of the anvil member and for positioning the anvil member at a desired location relative to the sonic horn face 15.

As discussed in the aforementioned copending application, it has been determined that the ultrasonic cutting and sealing apparatus 10 should include means 60 mounting the anvil member 20 under a predetermined pressure and for permitting movement of the anvil member 20 away from the sonic horn means 14 a predetermined distance upon contact of the anvil member 20 by the sonic horn face 15 during its vibrations. With this arrangement, a predetermined force, preferably about 40 to 50 psig, is exerted by the anvil member 20 on the material M upon contact between the sonic horn 14 and the anvil means 12 and so that the anvil member 20 will float or move away from the sonic horn means 14, preferably about $\frac{1}{8}$ to $\frac{1}{4}$ inch, as it is contacted by the sonic horn means 14 for aiding in providing the desired cutting and sealing action on the material M. This means 60 includes a compression spring device 61 and an air operated piston and cylinder device 62, the construction and operation of which are fully described and explained in the aforementioned copending application and reference may be had thereto for a full understanding thereof.

In accordance with the preferred form of this invention, the anvil means 12 further includes timed driving means 70 connected with the anvil wheel member 20 for rotating the anvil wheel member 20 constantly at a predetermined very slow speed or a predetermined distance at predetermined time intervals. As illustrated in FIGS. 2 and 9, this timed driving means may be in the form of synchronous motor or a timer and motor drive 71 with a flexible drive shaft 72 extending therefrom and connected with the shaft 30 of the anvil wheel member 20. Such timed driving means are commercially available and complete details of their construction and operation are not believed necessary herein.

Alternatively, as shown in FIG. 10 particularly, the shaft 30 may have a nut 75 in lieu of the timed driving means and such nut may be loosened and the anvil wheel member 20 manually rotated a predetermined distance at predetermined timed intervals.

Thus, as may be clearly seen from the above description, the present invention has provided an improved anvil construction for use in ultrasonic apparatus for edge cutting and sealing moving lengths of at least partially thermoplastic material, which is characterized by being adjustable to positions for effecting clean and sharp edge cutting and desired amounts of edge sealing in the material while resisting wear on the anvil. Such adjustment is in the form of pivotal movement of an anvil member to adjust the acuteness of the included angles of the first and second surfaces extending from the cutting edge of the anvil and are in the form of timed rotation of the anvil wheel member so that a fresh portion of the cutting edge thereof may be positioned for contact by the sonic horn when wear occurs on such cutting edge.

In the drawings and specification there have been set forth preferred embodiments of this invention, but it is to be understood that the invention is not limited thereto and may be embodied and practiced in other ways within the scope of the following claims.

What is claimed:

1. In an ultrasonic apparatus for edge cutting and sealing moving lengths of at least partially thermoplastic material, particularly textile fabric having at least some thermoplstic fibers, and including anvil means and vibrating sonic horn having a flat working face cooperating with and vibrating against said anvil means for the ultrasonic edge cutting and sealing as the material moves between said sonic horn means and said anvil means; the improvement of a construction of said anvil means characterized by being adjustable to positions for effecting clean and sharp edge cutting and desired amounts of edge sealing in the material while resisting wear on said anvil means, said anvil means comprising:

an anvil member defining a peaked cutting edge for cutting the moving material as said sonic horn means vibrates against said cutting edge, and first and second surfaces extending in respective opposite directions from said peaked cutting edge and forming respective included acute angles with said horn face from said cutting edge, of said first and second surfaces surfaces forming a sealing surface for sealing the cut edge of the material a predetermined distance inwardly of the out edge as said sonic horn vibrates against said anvil member and the other of said first and second surface forming a reinforcing surface for said cutting edge; and means mounting said anvil member for selective pivotal movement about an axis perpendicular to said cutting edge for varying the included angles of said sealing and reinforcing surfaces so that the included angle of said sealing surface is less than the included angle of said reinforcing surface, the predetermined distance of sealing being determined by and increasing with the increasing acuteness of the predetermined included angle of said sealing surface.

2. In an ultrasonic apparatus, as set forth in claim 1, in which said anvil member comprises a wheel having a beveled periphery defining therearound said peaked cutting edge and said first and second surfaces, and in which said anvil means further includes means mounting said wheel for rotation so that a fresh portion of said peaked cutting edge can be positioned for vibrating contact by said sonic horn face after wear has occurred on said peaked cutting edge.

3. In an ultrasonic apparatus, as set forth in claim 2, in which said anvil means further includes timed driving means connected with said anvil wheel for rotating said anvil wheel.

4. In an ultrasonic apparatus for edge cutting and sealing moving lengths of at least partially thermoplastic material, particularly textile fabric having at least some thermoplastic fibers, and including anvil means and vibrating sonic horn means having a flat working face cooperating with and vibrating against said anvil means for the ultrasonic edge cutting and sealing as the material moves between said sonic horn means and said anvil means; the improvement of a construction of said anvil means characterized by being adjustable to positions for effecting clean and sharp edge cutting and desired amounts of edge sealing in the material while resisting wear on said anvil means, said anvil means comprising:

a wheel-shaped anvil member having a beveled periphery defining therearoung a peaked cutting edge for cutting the moving material as said sonic horn vibrates against said cutting edge, and first and second surfaces extending in respective opposite directions from said peaked cutting edge and forming respective included acute angles with said horn face from said cutting edge, one of first and second surfaces forming a sealing surface for sealing the cut edge of the material a predetermined distance inwardly of the cut edge as said sonic horn vibrates against said anvil member and the other of said first or second surface forming a reinforcing surface for said cutting edge;

means mounting said anvil member for rotation so that a fresh portion of said peaked cutting edge can be positioned for vibrating contact by said sonic horn face after wear has occurred on said peaked cutting edge and for selective pivotal movement about an axis perpendicular to said cutting edge for varying the included angles of said sealing and reinforcing surfaces so that the included angle of said sealing surface is less than the included angle of said reinforcing surface, the predetermined distance of sealing being determined by and increasing with the increasing acuteness of the predetermined included angle of said sealing surface; and timed driving means connected with said anvil member for rotating said anvil member.

5. In an ultrasonic apparatus, as set forth in claim 1 or 4, in which the predetermined included angles of said sealing and reinforcing surfaces are equal when said anvil wheel member is positioned by said mounting means perpendicular to said sonic horn face.

6. In an ultrasonic apparatus, as set forth in claim 1 or 4, in which said anvil member is preferably positioned so that the included angle of said sealing surface of said anvil is about 3 to 20 degrees.

7. In an ultrasonic apparatus, as set forth in claim 1 or 4, in which said anvil member is preferably positioned so that the included angle of said sealing surface of said anvil is about 5 to 15 degrees.

8. In an ultrasonic apparatus, as set forth in claim 1 or 4, in which said anvil member is preferably positioned. so that the included angle of said reinforcing surface is at least 2 ½ degrees larger than the included angle of said sealing surface and no greater than 45 degrees.

9. In an ultrasonic apparatus, as set forth in claim 1 or 4, in which said anvil member is preferably positioned so that the included angle of said reinforcing surface of said anvil is about 30 degrees.

10. In an ultrasonic apparatus, as set forth in claim 1 or 4, in which said anvil means further includes means for moving said anvil member parallel to said sonic horn face for compensating for pivotal movement of said anvil member and for positioning said anvil member at a desired location relative to said sonic horn face.

11. In an ultrasonic apparatus, as set forth in claim 1 or 4, in which said anvil means further includes means for moving said anvil member perpendicular to said sonic horn face for compensating for pivotal movement of said anvil member and for positioning said anvil member at a desired location relative to said sonic horn face.

12. In an ultrasonic apparatus, as set forth in claim 1 or 4, in which said anvil means further includes means for moving said anvil member parallel to said sonic horn face and means for moving said anvil member perpendicular to said sonic horn face, for compensating for pivotal movement of said anvil member and for positioning said anvil member at a desired location relative to said sonic horn face.

13. In an ultrasonic apparatus, as set forth in claim 1 or 4, in which said anvil means further includes means mounting said anvil member under a predetermined pressure and for movement away from said sonic horn means a predetermined distance upon contact of said anvil means by said sonic horn means during its vibrations, so that a predetermined force is exerted by said anvil means on the fabric upon contact between said horn means and said anvil means and so that said anvil means will float as it is contacted by said horn means for aiding and providing the desired cutting and sealing action on the fabric.

14. In an ultrasonic apparatus, as set forth in claim 13, in which the predetermined pressure of said anvil mounting means is about 40 to 50 psig, and in which said anvil mounting means provides for movement of said anvil member a distance of from about ⅛ to ¼ inch away from said horn means upon contact of said anvil member by said horn means.

* * * * *

UNITED STATES PATENT AND TRADEMARK OFFICE
CERTIFICATE OF CORRECTION

PATENT NO. : 4,542,771

DATED : September 24, 1985

INVENTOR(S) : George Louis Payet, James Eston Hendrix, Jack Russell Lowery

It is certified that error appears in the above-identified patent and that said Letters Patent are hereby corrected as shown below:

In the references cited 3,582,144 should be -- 3,852,144 --.

Column 1, line 33, delete "sent".

Column 4, line 49, "aforeorementioned" should be -- aforementioned --.

Column 6, line 29, after "horn" insert -- means --.

Column 6, line 45, after "edge," insert -- one of --.

Column 6, line 46, after "surfaces" delete the second -- surfaces --.

Column 6, line 48, "out" should be -- cut --.

Column 7, line 22 "therearoung" should be -- therearound --.

Column 8, line 8, after "position" delete the -- . --.

Signed and Sealed this

Twenty-fourth Day of December 1985

[SEAL]

Attest:

DONALD J. QUIGG

Attesting Officer

Commissioner of Patents and Trademarks